(No Model.)
J. BUCKLEY.
LEVER.
No. 418,907. Patented Jan. 7, 1890.
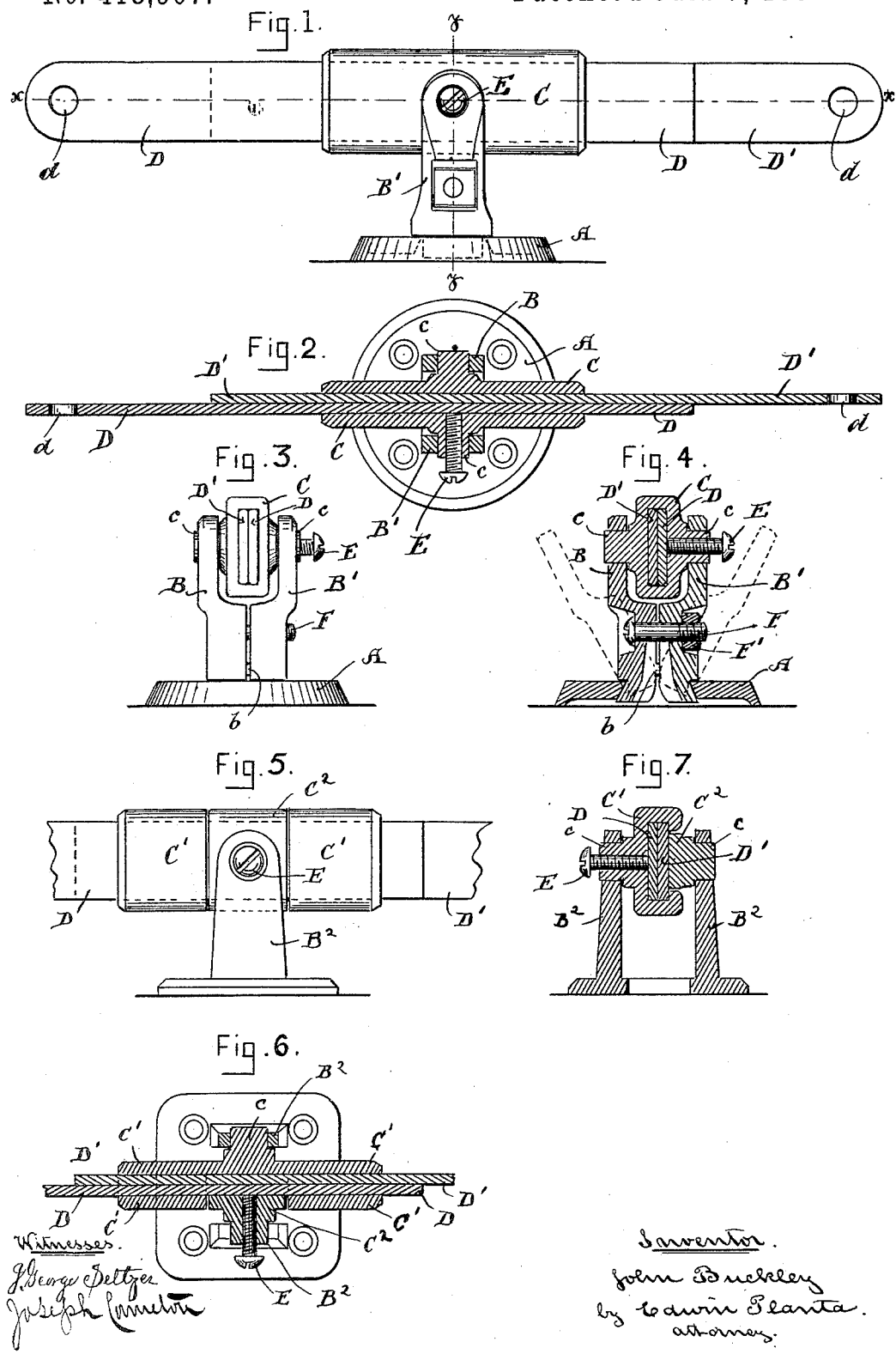

though the body of the standards and

UNITED STATES PATENT OFFICE.

JOHN BUCKLEY, OF BOSTON, MASSACHUSETTS.

LEVER.

SPECIFICATION forming part of Letters Patent No. 418,907, dated January 7, 1890.

Application filed September 20, 1889. Serial No. 324,576. (No model.)

*To all whom it may concern:*

Be it known that I, JOHN BUCKLEY, a citizen of the United States, residing at Boston, in the county of Suffolk and State of Massachusetts, have invented certain new and useful Improvements in Levers, of which the following, taken in connection with the accompanying drawings, is a specification.

My invention relates to that class of levers that are extensible, and more especially designed for plumbers' use in connection with water-closet tanks; and it consists in the peculiar construction and arrangement of parts, as hereinafter fully described, and pointed out in the claims.

Referring to the accompanying drawings, Figure 1 represents a side view of a lever embodying my invention. Fig. 2 is a horizontal section taken on the line $x\ x$ of Fig. 1. Fig. 3 is an end view of the same, and Fig. 4 is a vertical section taken on line $y\ y$ of Fig. 1. Figs. 5, 6, and 7 are respectively side view, horizontal section, and cross-section through the center, of a modification.

A is a base-plate that is secured to the tank in any desired position. In the center of this plate is a hole beveled outwardly from the top to the under side of the plate, as shown.

B B' are two standards, the lower ends of which are of a dovetail form to correspond to the bevel of the hole in the plate A. The sides of the lower portion are cut straight, as shown in dotted lines in Fig. 1, so as to allow them to be passed through the hole in the plate A. The upper ends of the standards spread out, as shown, so as to form a fork, and are each provided near its top with a round hole.

C is a hollow shell provided on each side with a trunnion $c$, which are mounted in the holes in the upper ends of the standards B B'.

D D' are adjustable arms forming the lever, which arms pass side by side through the hollow shell C, and when adjusted to the required length are held by a set-screw E, that passes through one of the trunnions $c$. The outer end of each of the arms D D' is provided with a hole $d$ for making the required attachment to the valve and operating cord or chain.

The two standards B B', when in position, are held together by means of a screw F, that passes through the body of the standards and nut F', as shown in Fig. 4.

To insert the lower ends of the standards B B' into the hole in the base-plate A, their upper ends are spread apart, as shown in dotted lines in Fig. 4. The sides being cut away, as before described, allow them to pass through the hole. The upper ends are then brought together, the trunnions $c$ of the shell C having been inserted in their bearings in the standards, and the two standards are locked together by the bolt and nut F F'. A small projecting piece $b$ is formed near the lower edge of the bearing B, which acts as a fulcrum when the nut F' is tightened up, and causes the lower ends of the bearings to come into contact with the base-plate A and be held fast; but should it be desired to shift the position of the shell and lever the nut F' can be loosened, when the standards B B', and with them the shells C and arms D D', are free to be turned to any desired position, when the nut F' can be tightened up and hold them in that position. The length of the lever can be regulated by shifting the two arms D D' so that their ends are in the desired position when they are locked by the set-screw E.

In Figs. 5 to 7 I have shown a modification, in which the shell is made in two parts C' C², each provided with a trunnion $c$. The central part of the main portion C' is cut away on one side and at the top and bottom, and the central portion C² is of such form as to occupy the space that is cut out in the portion C'. It will be seen that by this construction of shell rigid standards B² may be employed. The divided shell is first placed in position so that their trunnions $c$ are in their bearings. Then the lever-arms D D' are inserted, the two portions of the shell being forced outwardly, so as to retain them in their bearings in the standards, and the set-screw E causes the bars to be securely held in the shell.

It is obvious that, if desired, a single bar may be employed instead of the two bars D D'.

What I claim as my invention is—

1. In a device, substantially as described, two adjustable arms D D', in combination with the shell C, the inner ends of the arms passing through the shell and held in place by a set-screw E, said shell being mounted in suitable bearings, substantially as shown and described.

2. In a device, substantially as described, the standards B B′, the lower ends of which are of a dovetail form, in combination with a base-plate A, having a hole beveled outwardly from the top to its under side, and the bolt F and nut F′, substantially as set forth.

3. In a device, substantially as described, the base-plate A, having a hole beveled outwardly from the top to its under side, the standards B B′, the lower ends of which are of a form to fit the hole in the base-plate, one of said standards having a small projection b, and the bolt F and nut F′, whereby the said standards can be clamped in any desired position, substantially as set forth.

4. The extensible lever herein described, the same consisting of the adjustable arms D D′, shell C, having trunnions c, the set-screw E, for securing the bars at any desired length, the said trunnions c being mounted in standards B B′, the lower ends of which are of a dovetail form and fit into a hole of corresponding form in the base-plate A, and the bolt and nut F F′ for clamping the standards in place, substantially as shown and described.

5. A shell mounted on trunnions or bearings in suitable standards and having a lever formed of a bar or bars passing through the shell, whereby the fulcrum can be adjusted relatively to the length of the lever, said lever being secured by a set-screw, substantially as set forth.

In testimony whereof I have signed my name to this specification, in the presence of two subscribing witnesses, on this 10th day of September, A. D. 1889.

JOHN BUCKLEY.

Witnesses:
CHAS. STEERE,
EDWIN PLANTA.